United States Patent [19]
Ho et al.

[11] Patent Number: 5,833,134
[45] Date of Patent: Nov. 10, 1998

[54] WIRELESS REMOTE TEMPERATURE SENSING THERMOSTAT WITH ADJUSTABLE REGISTER

[76] Inventors: Tienhou Joseph Ho, 2336 Glenstone Ave., Hacienda Heights, Calif. 91745; Le Tang, 20526 Pacific Ave., Walnut, Calif. 91589

[21] Appl. No.: 549,391

[22] Filed: Oct. 27, 1995

[51] Int. Cl.⁶ .............................. F24F 7/00; G05D 23/00
[52] U.S. Cl. ........................ 236/49.3; 236/51; 454/258
[58] Field of Search ................... 236/51, 49.3; 454/258

[56] References Cited

U.S. PATENT DOCUMENTS

| | | | |
|---|---|---|---|
| 3,159,212 | 12/1964 | Patrick | 165/267 X |
| 3,605,877 | 9/1971 | Isaacs et al. | 165/267 |
| 5,135,045 | 8/1992 | Moon | 165/290 X |
| 5,299,430 | 4/1994 | Tsuchiyama | 236/51 X |
| 5,341,988 | 8/1994 | Rein et al. | 236/51 X |

*Primary Examiner*—William E. Wayner
*Attorney, Agent, or Firm*—Ben E. Lofstedt, Esq

[57] ABSTRACT

A wireless remote temperature sensing and control thermostat system for regulating air ducted air conditioning systems incorporating a normal mode and a remote control mode, including a combination thermostat and radio-frequency receiver unit, a radio-frequency transmitter, and an adjustable register. In the normal mode, a reference temperature is set by the thermostat for the temperature throughout the entire air conditioned structure. In the remote control mode, the local temperature sensing and control functions of the thermostat are disabled and the transmitter unit will take over the temperature sensing at the remote site which, in turn, then will control the thermostat unit. As a result, the users will be able to more accurately control their own personal environment.

8 Claims, 7 Drawing Sheets

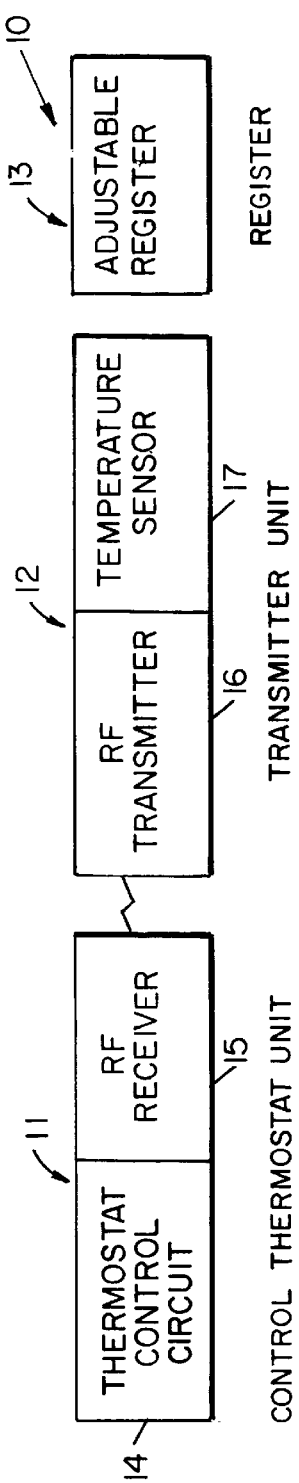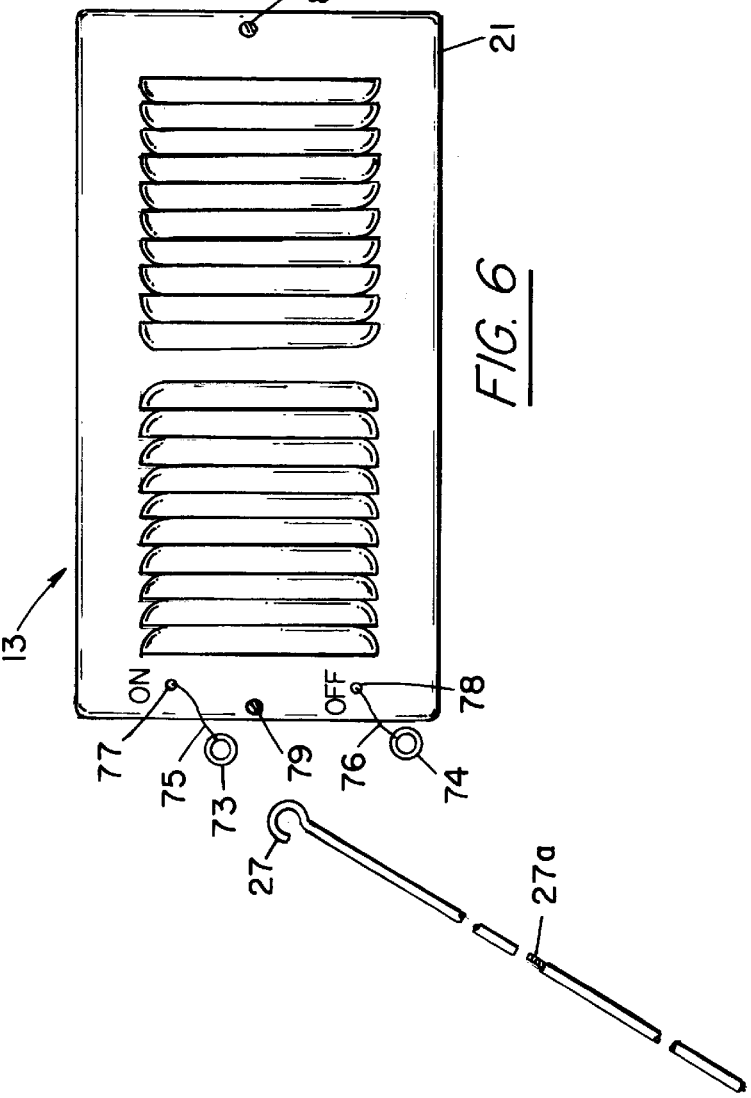

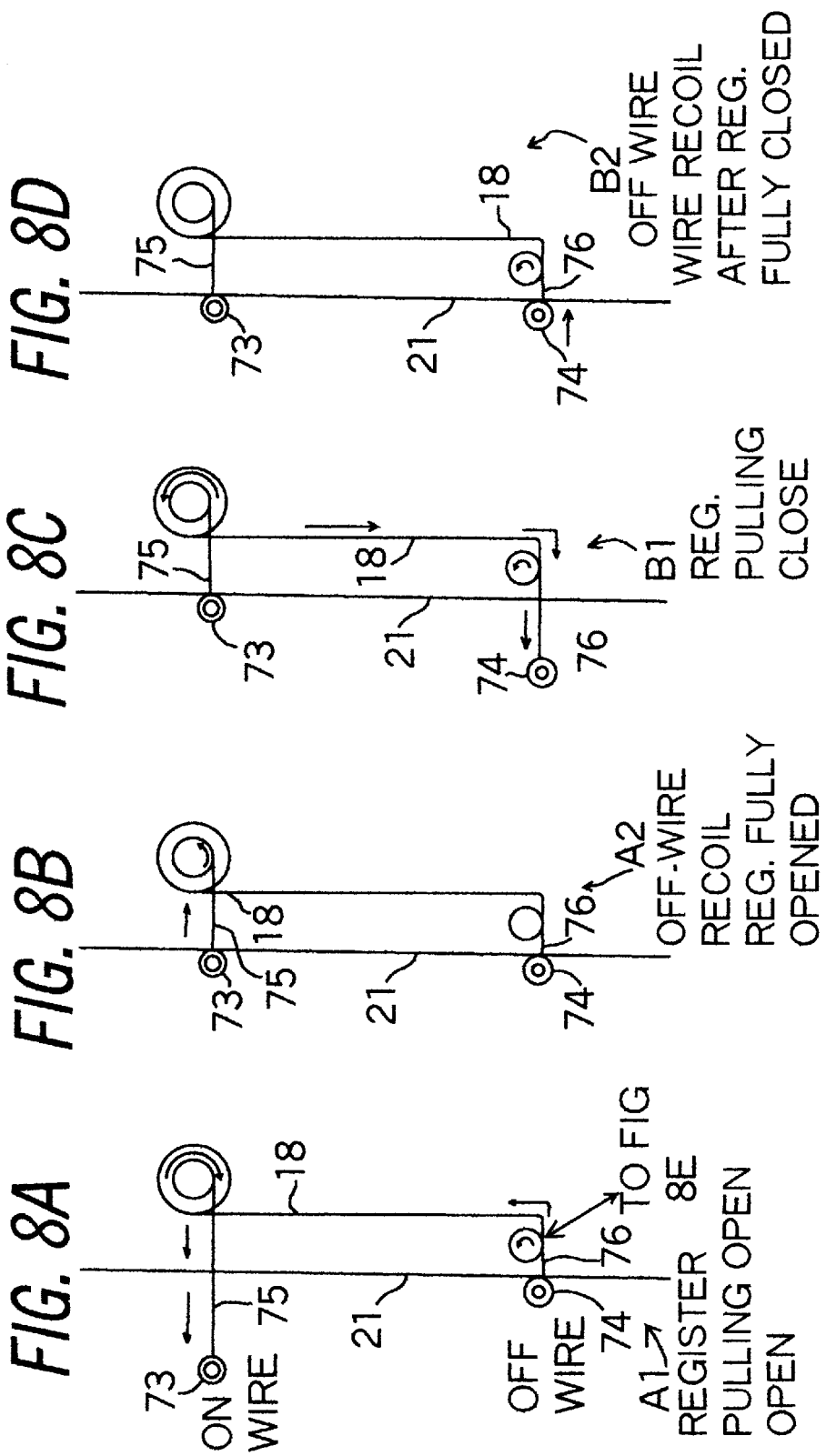

WIRELESS REMOTE TEMPERATURE SENSING THERMOSTAT WITH ADJUSTABLE REGISTER

BACKGROUND OF THE INVENTION

1. Field of the Invention

Generally, the present invention relates to a local and remote control system in combination with an air flow control register for use in a multi-zoned heating-ventilation and air-conditioning (HVAC) unit where air is delivered into one or more zones through a plurality of air ducts and into the zones via air delivery register(s), and, more specifically, to such a system which incorporates not only a local thermostat control, but one which includes a radio-frequency receiver and a portable radio-frequency transmitter and thermostat control unit for remotely controlling the HVAC unit, in combination with a manually-operable shutter for controlling the flow of air through an air flow control register.

2. Description of the Prior Art

It is well known in the prior art that heating ventilation and air conditioning (HVAC) systems incorporate the use of a thermostat to control the operation of a heater or furnace to produce a nearly constant temperature at the location of the thermostat. In the type of system most commonly used in homes, the heat is supplied by a forced-air heating system and/or air-conditioning cooling system, oftentimes referred to as a heating ventilation and air conditioning (HVAC) system, and the thermostat is mounted on a wall in the room whose temperature is to be controlled. Typically, the HVAC includes three pair of electrical terminals. When a conductive path is established between one of these pairs of terminals, the heater is turned on, but when the conductive path is opened, the heater is turned off. The air conditioner and forced-air fan function similarly. A typical thermostat of the type used in homes includes a bimetallic element which is arranged to tilt a liquid-mercury filled switch so as to close the switch when the room temperature, also called the ambient temperature, falls below a preset temperature. The contacts of the thermostatic switch normally are connected to the terminals of the HVAC, so that when the ambient temperature falls below the preset temperature, a conductive path is established between the two terminals of the heating system through the thermostat.

The typical thermostat control system described above normally includes means for setting in various selected temperatures which the system then seeks to maintain on a pre-set basis. With such a system, it is necessary to adjust the thermostat each time the pre-set temperature is to be changed.

With the present invention, the individual can activate the switch from a remote location, thereby cutting in to take control of the override thermostat which can now be set to a more comfortable pre-set temperature.

Typically, the location of the thermostat is chose when the building or home is constructed. In order to change the temperature of a closed environment which uses a fixed thermostat requires movement of the thermostat and its switches. Movement of the thermostat to another location at a later date is both difficult and expensive.

Further, there are occasions when an occupant desires to modify the temperature of the building or home but doing so requires a trek to the location where the thermostat is situated. Sometimes, this is inconvenient, difficult or even impossible. For example, if there is an invalid, especially one who is confined to a bed or a wheelchair, adjusting the thermostat may be difficult or impossible because the thermostat is usually situated on a wall at, or near, eye-level. In another example, should the temperature inside the residence fall below a comfortable level at night because the preset temperature is set too low, one might find it relatively inconvenient and uncomfortable to get up and out of his or her bed, turn on a light and adjust the thermostat to the desired temperature.

It has also been well recognized in the prior art that the cost of heating or cooling large buildings poses a major impact to the profit margins of the large business enterprises that occupy these buildings. It is also known that for small business entities which operate in smaller building structures and function as clinics, offices or retail stores, that the total energy costs related to lighting, heating or cooling oftentimes is structured as follows: 40% of the cost is for heating and cooling, 40% for lighting and approximately 20% is consumed in the operation of business-related equipment. The U.S. Department of Energy estimates that a substantial portion of the heating, cooling and lighting cost is largely wasted owing to a lack of an economical, effective system to control and effectively manage such systems.

Large business structures are often designed with elaborate lighting, heating and cooling control systems built into the structures with an expectation that significant energy savings will be realized for the businesses occupying these structures. In the smaller business building market almost all heating and ventilation systems employ a single zone HVAC unit to supply conditioned, heated or cool air to more than one distinct zone or room. Each room or zone may have different comfort requirements due to occupancy differences, individual preferences, exterior heat and cooling load differences or the different zones may be on different levels with different heating or cooling requirements. This type of system is referred to a single zone HVAC unit because it is normally controlled from one centrally located ON/OFF thermostat controller. In a building which may have more than one zone and whose zones have different heating, cooling requirements, for the most part, there is no one, good representative location for the installation of a thermostat controller.

A number of noteworthy attempts to create systems which address the problems of controlling the diverse needs of a plurality of zones whose air heating and air cooling needs are provided by a single HVAC are found in the prior art.

In U.S. Pat. No. 4,969,508 (Tate et al.) (508) the temperatures in the room(s) are controlled by means of a wireless portable remote control unit which may be hand-held by the room occupant. The wireless remote control unit transmits information to a remote receiver in the ceiling of the room, which, in turn, provides signals to a main control unit physically coupled to external environmental control units such as the air conditioning system heater, damper motors and the like. In addition to being able to select heating and cooling modes remotely, the wireless remote control unit of the '508 patent may also operate in an energy saving mode. Such energy saving mode incorporates a light sensing circuit for overriding preselected conditions when the lights in the room are not on. An infrared transmitter is employed for transmitting data to an infrared receiving unit mounted on the ceiling when the lights are on.

The subject invention is distinguishable over the '508 patent in that there is no requirement for individually motor-powered dampers in the air supply ducts for controlling the air into each zone. Use of the subject invention allows for a simple installation of a self-contained manually controllable register. Further, the present invention does not require the installation of additional wiring of the entire duct work system in order to supply electrical power to the many power-driven dampers required by '508. The subject invention does not require such additional wiring and, as a result, the present invention is easier and more economical to install.

Parker et al. U.S. Pat. No. 4,530,395 ('395) shows and describes yet another approach to providing multiple heating/cooling zones which employ a single zone HVAC unit. The '395 arrangement provides zone control in several zones in which each zone includes a control thermostat that is interfaced with a monitoring system so that each zone thermostat controls the HVAC unit as well as a damper unit for that particular zone. More specifically, the system shown in '395 is comprised of two or more computerized thermostats which control both the HVAC unit through the monitoring control and the air distribution system of each zone through the damper for each zone. The thermostats also operate under control of signals received from the monitor. The '395 is classic in its complex solution to the very simple concern of independently and automatically controlling the temperature in one of many zones concurrently. The '395 patent like the '508 requires electrically powered motors for each air flow control damper provided for each zone. No such complex wiring is required for operation of the subject invention and may be readily installed in existing HVAC systems by simply removing a selected air distribution register and placing within an exposed air supply duct the apparatus of the instant invention. A wireless thermostat control device hung on a wall of a zone wall completes the installation of the subject invention in almost no time at all with a minimum amount of labor.

U.S. Pat. No. 4,479,604 (Robert S. Didier) ('604) presents yet another multiple zone system incorporating a single central HVAC unit. In the '604 patent, there is shown and described a controller for a central plant feeding a plurality of adjustable zone regulators which bring their respective zones to selected and corresponding target temperatures. The controller has a number of temperature sensors and a plurality of zone actuators. The temperature sensors distributed one to a zone, each produce a zone signal signifying zone temperature. A zone control terminal is provided for each zone actuators. Each zone actuator can, in response to a signal at its zone control terminal, operate to adjust one of the corresponding zone regulators. The controller also has a control means coupled to each of the temperature sensors and to the zone control terminal of each zone actuator for starting the central plant. The central plant is started in response to a predetermined function of zone temperature errors (with respect to their respective target temperatures) exceeding a given limit, then the systems consider the temperature error for each of the zones. When the sum of the errors exceeds a given, pre-selected number, the furnace or air conditioner is placed on-line for starting.

In addition to the distinctions offered in respect of the '508 and '395 patents the subject invention is amazingly simple in design and generates its own power to thereby eliminate the need of complex additional wiring embodied in the '604 patent.

Portable thermostats are known in the prior art, such as Butkovich, et al., in U.S. Pat. No. 4,585,164 ('164). The device disclosed in '164 is a portable energy level control system which communicates with the HVAC to adjust the temperature to desired levels in specific rooms or zones by closing the registers of the air ducts thereby isolating some zones from any air conditioning or heating.

Another portable thermostat is shown and described by Cherry, et al, in U.S. Pat. No. 4,433,719 ('719) which adjusts temperature by sending signals to the HVAC unit every thirty (30) seconds.

In U.S. Pat. No. 4,391,913 (Keldmann) ('913), a temperature regulating system is provided for control of temperature in a room which incorporates a refined temperature sensor in a room that adjusts the wall-mounted thermostat.

U.S. Pat. No. 4,336,902 (Neal) ('902) utilizes a second thermostat to override the first thermostat, a wall-mounted one.

U.S. Pat. No. 4,186,873 (Geisler) ('873) regulates a humidity control system.

The present invention provides a significantly greater degree of flexibility of operation than the systems of the prior art, and the present invention represents a major improvement over the prior art systems in its ability to modify and conserve energy where the need or demand is irregular.

SUMMARY OF THE INVENTION AND OBJECTS

Fundamentally, the instant invention described herein comprises a remote temperature sensing and control thermostat system for regulating air ducted air conditioning systems incorporating a normal mode and a remote control mode, including a combination thermostat and radio-frequency receiver unit, a radio-frequency transmitter, and an adjustable register. In the normal mode, a reference temperature is set by the thermostat for the temperature throughout the entire air conditioned structure. In the remote control mode, the local temperature sensing and control functions of the thermostat are disabled and the transmitter unit will take over the temperature sensing at the remote site which, in turn, then will control the thermostat unit. As a result, the users will be able to more accurately control their own personal environment.

It is one object, feature and advantage of the present invention to solve the problems of prior art control schemes for air distribution systems.

Another object of the instant invention is to divide the control area into a temperature-controlled zone and an energy-saving zone, where the temperature-controlled through the remote temperature-sensing transmitter and the energy-saving zone is the space where no temperature control is needed by closing the shutters of the air duct registers that deliver air-conditioned air into that space.

A yet still further object of the present invention disclosed herein is to provide a simple replacement of existing thermostats where the users can follow the instructions and install this modification to the existing system in their own homes without any professional services.

Another important and primary object, and feature of the instant invention is to incorporate a roll-up metal foil shutter in combination with an air duct register so that complete and precise control of the air flow exiting therefrom may be effectuated.

A yet still further and important feature of the present invention is to incorporate a manually controlled, roll-up metal foil shutter in combination with an air duct register which is conveniently and remotely-controllable by means of a rod whereby the flow of air from the air-duct may be varied from zero to one-hundred percent.

It is another object, feature and advantage of the instant invention to eliminate the physical connection between the zone sensors and the controller of the air handler or air handling terminal unit of an air distribution system.

Another important object, feature and advantage of the present invention is to provide a zone sensor with reduced installation costs.

A yet still further important and primary object, feature and advantage of the present invention is to provide a zone sensor which can be easily relocated in response to temperature changes.

Another object, feature and advantage of the present invention is to provide a zone sensor which can be easily relocated in response to the temperature being conditioned.

It is yet a still further primary and important object and feature of the present invention to provide a wireless communication system for an air distribution system which can be easily retrofitted to existing HVAC installations.

Another important and primary object, feature and advantage of the present invention is to provide a wireless communication system for an air distribution system which can be easily upgraded in response to changing technology.

It is an object, feature and advantage of the present invention to provide a wireless communication system for an air distribution system which allows a controller for an air distribution system to operate independently of a particular zone sensor.

It is an object, feature and advantage of the present invention to provide a wireless communication system for an air distribution system which allows a controller of the air distribution system to operate independently of the location of a particular zone sensor.

It is an object, feature and advantage of the present invention to allow the controller of an air distribution system to respond to a user's personal comfort requirements.

Another important and primary object, feature and advantage of the present invention to provide a one-way wireless communication system for an air distribution system.

It is an object, feature and advantage of the present invention to provide a wireless communication system for an air distribution system using radio frequency as a communications medium.

It is an object, feature and advantage of the present invention to provide a wireless communications system for an air distribution system which facilitates air balancing.

Another important object, feature and advantage of the present invention is to provide a wireless communication system whose receivers and transmitters are substantially independent of location.

It is an object, feature and advantage of the present invention to provide a building automation and control system which is responsive to the comfort needs of an occupant on an individual basis.

BRIEF DESCRIPTION OF THE DRAWINGS

The description set forth above, as well as other objects, features and advantages of the present invention, will be more fully appreciated by referring to the detailed description and the drawings that follow. The description is of the presently preferred but, nonetheless, illustrative embodiment in accordance with the present invention, when taken in conjunction with the accompanying drawings therein;

FIG. 1 is a basic diagrammatic block diagram of the present invention and its functional components.

FIG. 6 is a front elevational view of the manually-adjustable air duct register of the present invention.

FIG. 8 is a side elevational view of the shutter mechanism of FIG. shown at various stages of its operation.

FIG. 9 is an isometric view of the manually-operable air valve of the present invention in its operative disposition between the air duct and air duct outlet and the air register.

Figure 2:
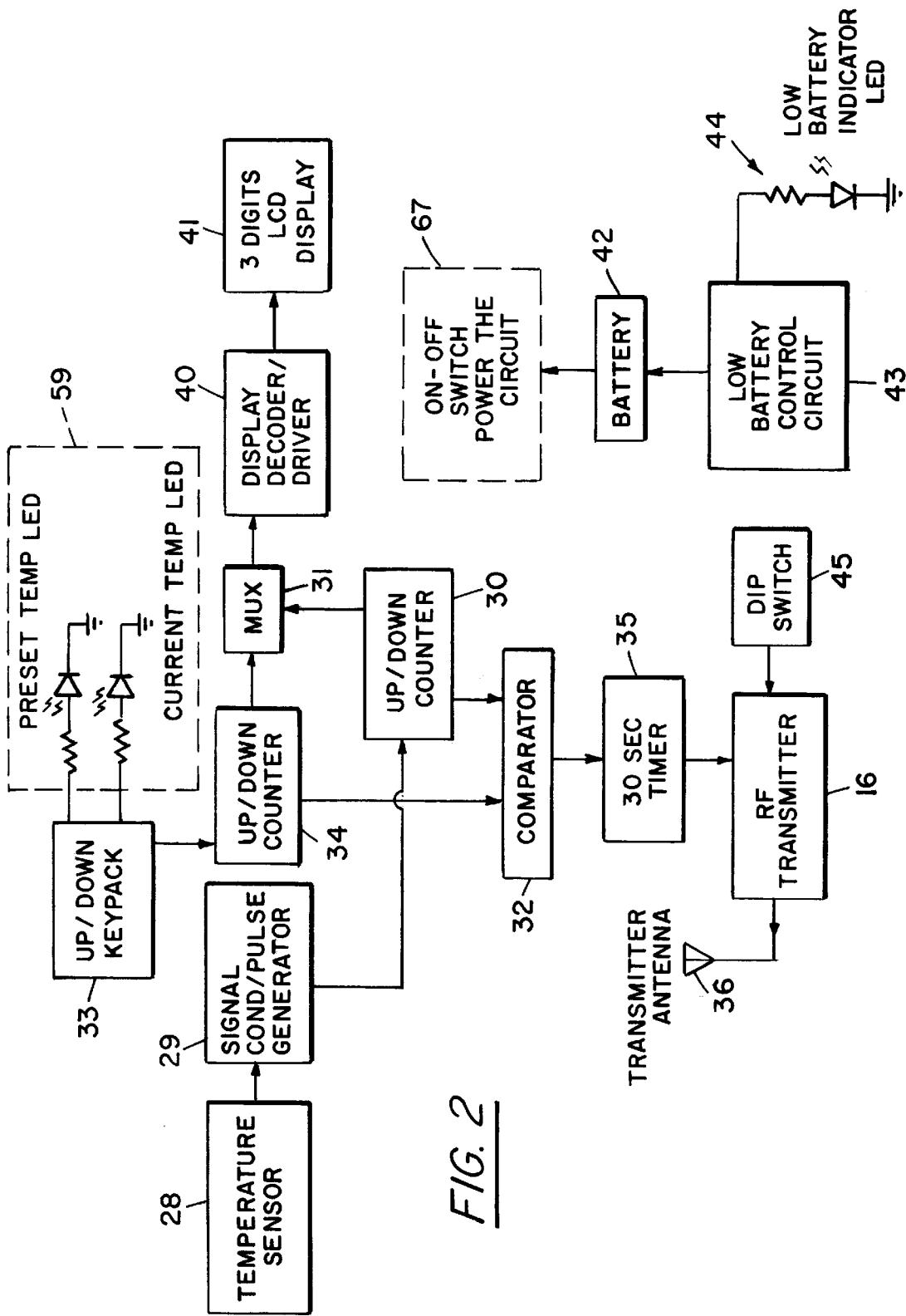
FIG. 2 is a functional block diagram of the transmitter unit portion of the present invention.

DESCRIPTION OF THE PREFERRED
EMBODIMENT OF THE INVENTION

With continued reference to all of the drawings herein, and with special reference now to FIG. 1, the present invention, a wireless remote temperature sensing and control thermostat system with an adjustable register is shown in its most fundamental functional block form and is generally indicated at 10. The wireless remote temperature sensing and control thermostat system 10 consists of three functional units. The first functional unit is a control thermostat unit 11 formed by the combination of a thermostat control circuit 14 and an RF receiver 15. The second functional unit is a transmitter unit 12 formed by the combination of an RF transmitter 16 and a temperature sensor 17. As shown and depicted in FIGS. 1 and 9, the third functional unit is a register 13 with a manually-operable, metal foil shutter air-control valve 18 which is used for controlling the air flow through an air duct 20 and the air duct outlet 19 via an register 21.

The instant invention is generally intended for use in regulating air ducted air conditioning systems and incorporates a NORMAL MODE and a REMOTE CONTROL MODE. In the NORMAL MODE, the system works as any other thermostatically-controlled HVAC system might work in the prior art. In the REMOTE CONTROL MODE, it is possible to shut off the air flow into all portions of the building except those rooms occupied by people thereby allowing the users to exercise 100% control over the energy usage within the building/structure to promote substantial energy savings and to reduce the amount of the utility bills as well.

Because air-duct registers found and used in the prior art cannot effectively totally block the flow of air therethrough, as shown in detail in FIG. 9, we have designed a new adjustable register 13 consisting of the combination of a manually adjustable louvered air-duct register 21 and a manually-operable, metal foil shutter air-control valve 18 which is used for controlling the air flow from the air outlet 19 of an air-duct 20 to the air-duct adjustable louvered register 21.

As shown and illustrated in FIG. 1, the control thermostat unit 11 consists of two functional units; a thermostat control circuit 14 and a radio-frequency receiver 15. The transmitter unit 12 consists of two functional units; a RF (radio-frequency) transmitter 16 and a temperature sensor 17 As shown in FIG. 9, the adjustable register 13 consists of a air-duct register 21 and a manually-operable metal foil air-control valve 18 for controlling the air flow between the air outlet 19 of an air duct 20 and the air-duct register 21.

The wireless remote temperature sensing and control thermostat system with adjustable register 10 can operate at either the NORMAL MODE or the REMOTE CONTROL MODE. In the NORMAL MODE, the system operates in a manner similar to any of the many thermostats found in the prior art. The control thermostat unit 11 controls the temperature of the house using the temperature of the air in a centrally-located hallway where most thermostats are installed as the reference temperature for the whole house. However, obviously, this location may not provide persons in other portions of the house with the air temperature they desire when they are in other and different locations in the house other than such centrally-located hallway.

Under the NORMAL MODE, the radio-frequency receiver 15 in the control thermostat unit 11 will ignore any signal from the transmitter unit 12.

Also, in the NORMAL MODE, a reference temperature is set by the thermostat control circuit 14 for the temperature throughout the entire air-conditioned structure.

Figure 7:
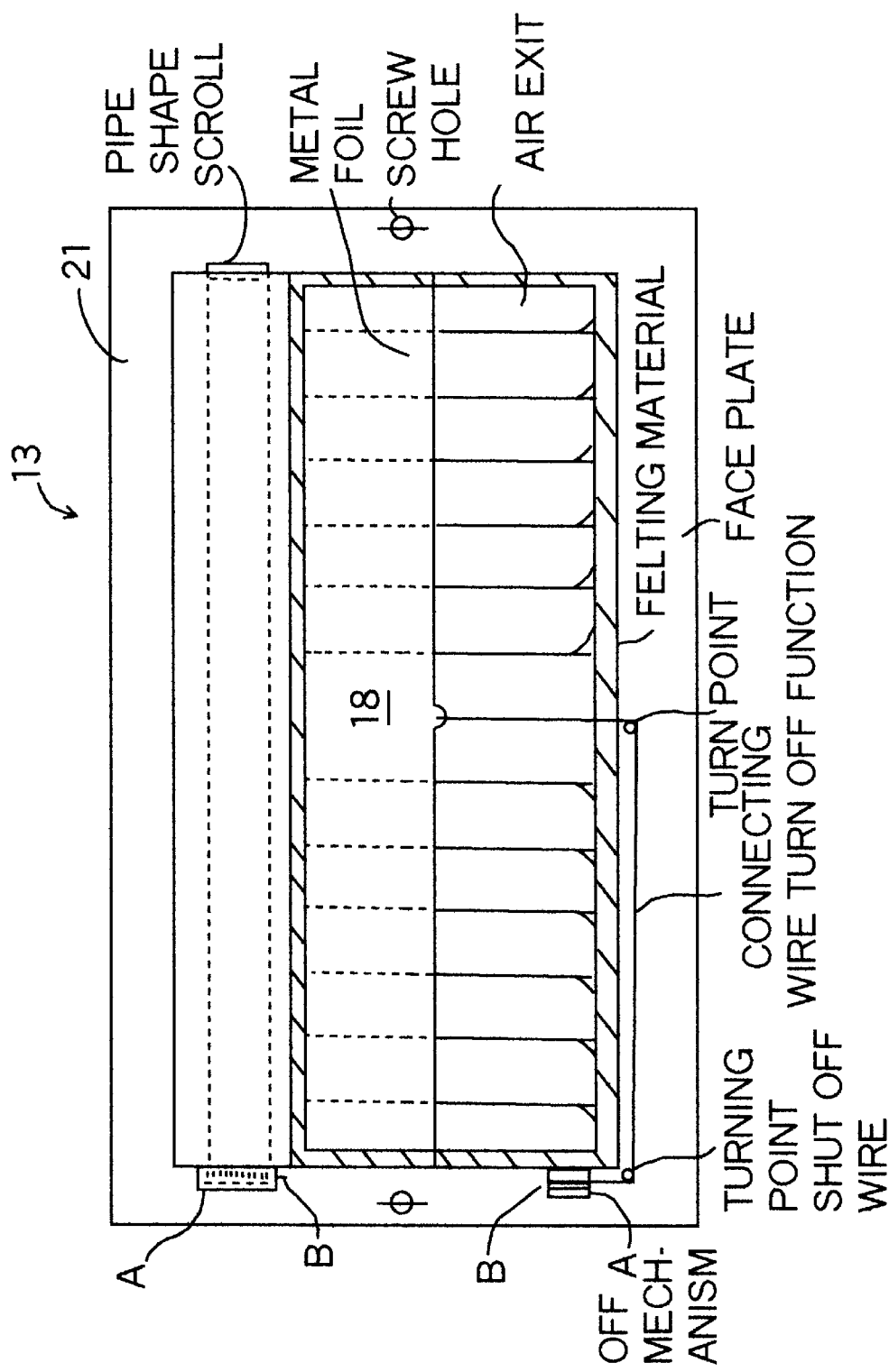
FIG. 7 is a front elevational view of the air duct register of the present invention shown in FIG. 6 with the front portion of the register removed showing the roll-up and down metal foil shutter mechanism for the register unit of the present invention.

In the REMOTE CONTROL MODE, the local temperature sensing and control functions of the control circuit thermostat 14 are disabled and the transmitter unit 12 will take over the temperature sensing at the remote site which, in turn, then will control the thermostat unit 14. As a result, the users will be able to more accurately control their own personal environment. For example, the users can adjust the amount of air flowing into any room or zone within the building with a manually operable metal foil air-control shutter valve 18 such as depicted in FIGS. 7, 8 and 9 of the Drawings. Here, a zone can be any room (bedroom, family room, studying room, den, hallway, etc.) in a house. The combination of the air-duct register 21 and the manually operable metal foil air-control shutter valve 18 which forms the adjustable register 13 will prevent any air from the air duct from exiting into a zone if the manually operable metal foil air-control shutter valve 18 is completely closed. This adjustable register 13 is an important part of the invention herein and offers significant improvements over the prior art in both air flow control and energy savings. In fact, it will improve the energy efficiency of heating or cooling if all control zones in the house are installed with these adjustable registers 13. This adjustable register 13 provides a similar function as an electrical damper but at one tenth (1/10) the cost of an electrical damper.

The installation of the control thermostat unit 11 involves the same amount of effort as the installation of a regular digital thermostat and the installation of the adjustable register 13 should be similar to replacing a common register, such as the air-duct register 21 shown in FIG. 9.

The transmitter unit 12 should be portable that can be used in any zone desired.

BASIC SYSTEM OPERATION (a) The Transmitter Unit

With special emphasis now on FIG. 1, the transmitter unit 12 has a temperature sensor 17 which senses the temperature of a zone where the desired temperature can be preset by the user via the transmitter unit 12. The transmitter unit 12 will then send an on/off signal to the control thermostat unit 14 which, in turn, will control the on/off of the heating or cooling system (depending on the heat/cool setting on the control thermostat unit) if a difference exists between the sensor temperature and the user-desired or user-selected temperatures. The temperature sensor 17 continues to monitor the zone temperature and the RF transmitter 16 then transmits an on/off signal to the RF receiver 15 on the control thermostat unit 11 approximately every 30 seconds or so. The RF transmitter 16 uses a radio frequency (RF) signal as the carrier wave. The effective distance for this RF transmitter 16 is approximately a 100 ft. radius depending on local conditions. The transmitter unit 12 is powered by a battery 42 shown in FIG. 2.

Turning now to FIG. 2, the control functions on the transmitter unit 12 consists of an on/off switch 67, a selector switch 45, an up and down temperature preset keypad or keypack 33, and a low battery warning flashing LED 44.

(b) The Control Thermostat Unit

With special emphasis now on FIG. 1, there is shown a control thermostat unit 11 with an RF receiver 15 and a thermostat control circuit 14. The RF receiver 15 receives an on/off electrical signal every 30 seconds, or so, from the RF transmitter unit 16 when the control thermostat unit 11 is set in the REMOTE CONTROL MODE. In the event that the RF Receiver 15 does not receive any on/off electrical signal from the RF transmitter 16 within five (5) minutes, the RF receiver 15 will generate and send an "off" signal to the thermostat control circuit 14 to turn off the fan and either the heating or cooling system. Nevertheless, the RF receiver 15 will continue to operate unless the mode is changed or until the RF receiver 15 receives the RE electrical signal from the RF transmitter 16. When this occurs, the RF receiver 15 will send an RF electrical signal to the thermostat control circuit 14 to resume the control operation.

The control thermostat unit 11 is powered by 24 VAC.

Under the NORMAL MODE, the RE receiver 15 will be disabled and local thermostat control circuit will take over the operation.

The control functions on the control thermostat unit consist of:

(a) a NORM/RC (normal/remote control) selector switch, (b) a HEAT/OFF/COOL selector switch, (c) a FAN ON/AUTO selector switch, (d) a temperature scale with preset dial, and (e) a LCD display showing the local temperature.

(c) The Register

With special emphasis now on FIGS. 6, 7, 8 and 9, the register 13 has an adjustable metal foil 18 in the back of the grill of the air-duct register 21 so that the air flow therethrough can be easily controlled by users manually. Such manual control can be exercised by a rod 27a one end of which is formed into a hook 27 to either open or close the manually operable metal foil air-control shutter valve 18. If a user wants to control the temperature of his/her bedroom, closing the air-duct registers 21 in other rooms will expedite the temperature adjustment process in the bedroom. Consequently, less energy will be wasted in other rooms where temperature control is unnecessary because the rooms are unoccupied.

DETAILED DESCRIPTION OF THE SYSTEM AND ITS OPERATION (a) Operation of the Transmitter Unit With special reference now to FIG. 2, operation of the transmitter unit 12 will be described hereinafter. The temperature sensor 28 senses the ambient temperature of the zone or room where the temperature sensor 28 is located. In correspondence thereto, the temperature sensor 28 generates an electrical signal which is delivered to the signal conditioner/pulse generator 29 where the signal is conditioned and thereafterwards a pulse is generated responsive to the signal received from the temperature sensor 28 indicative of the temperature sensed by the temperature sensor 28. The output signal of the signal conditioner/pulse generator 29 is fed to the up/down counter 30 which counts the pulses outputted from the signal conditioner/pulse generator 29 and, in turn, delivers output signals to the multiplexing unit (MUX) 31 and to the comparator 32.

Figure 3:
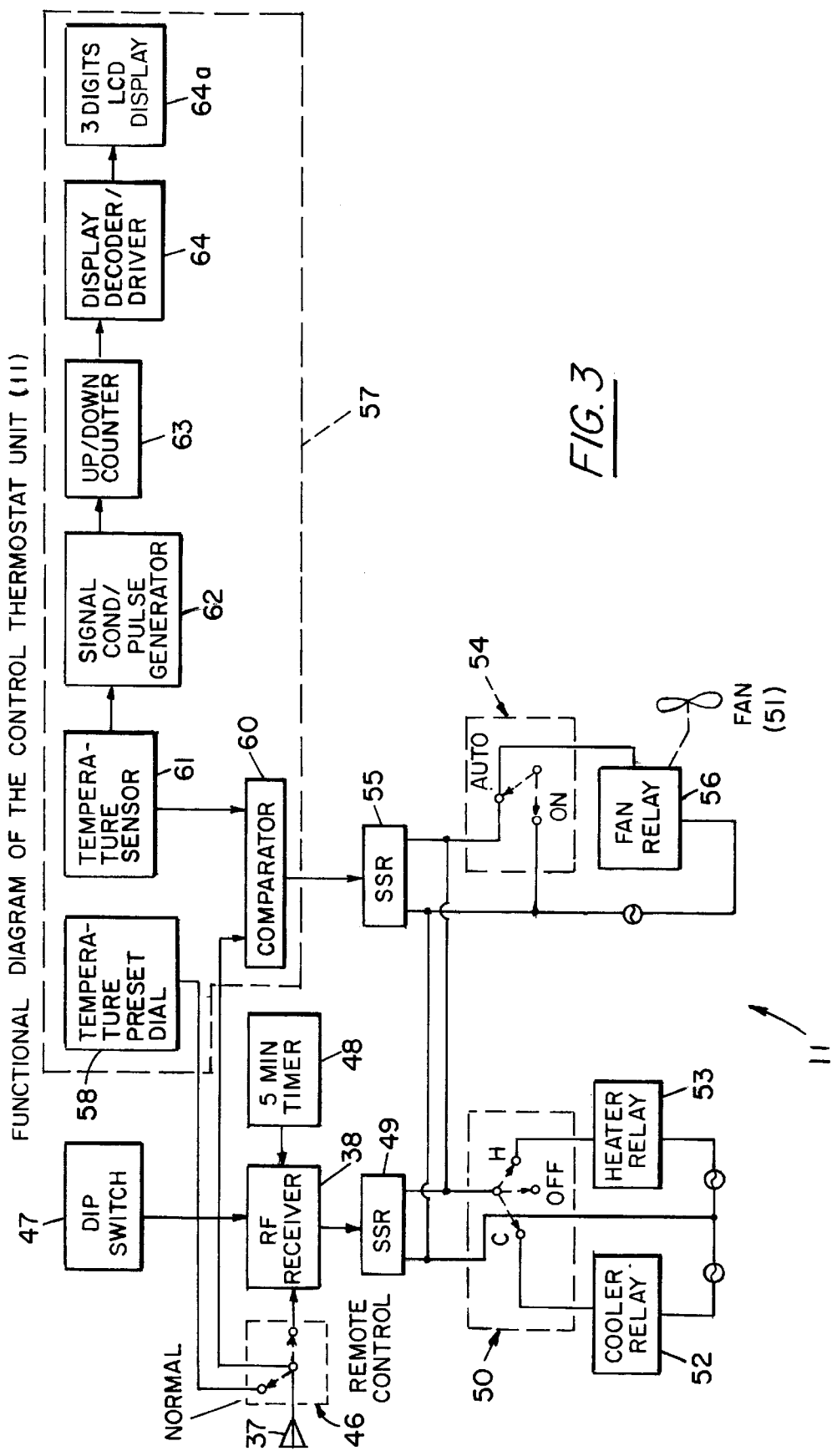
FIG. 3 is a functional block diagram of the control thermostat portion of the within invention.
Figure 4A:
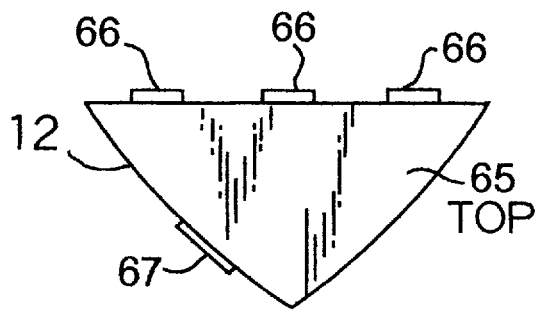
FIGS. 4a, 4b, 4c are one embodiment of a housing unit for the transmitter unit of the present invention.
Figure 4B:
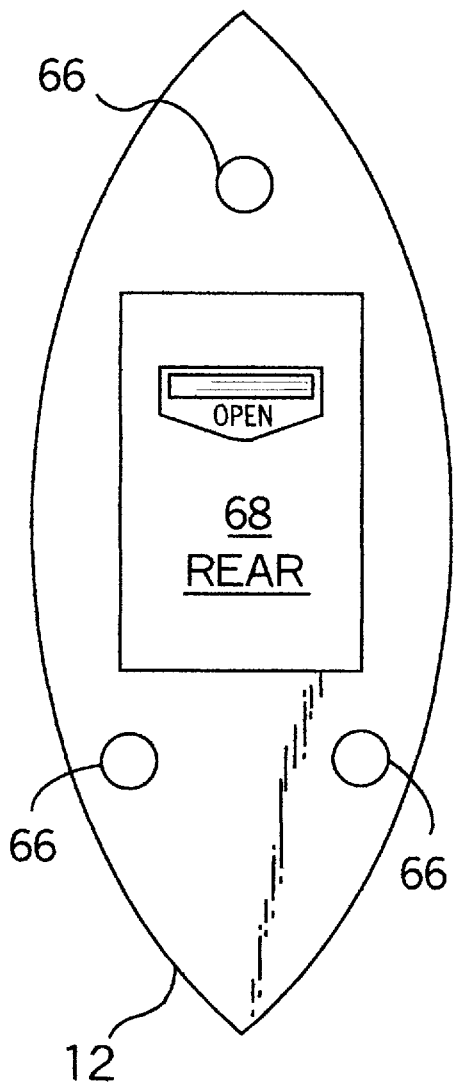
Figure 4C:
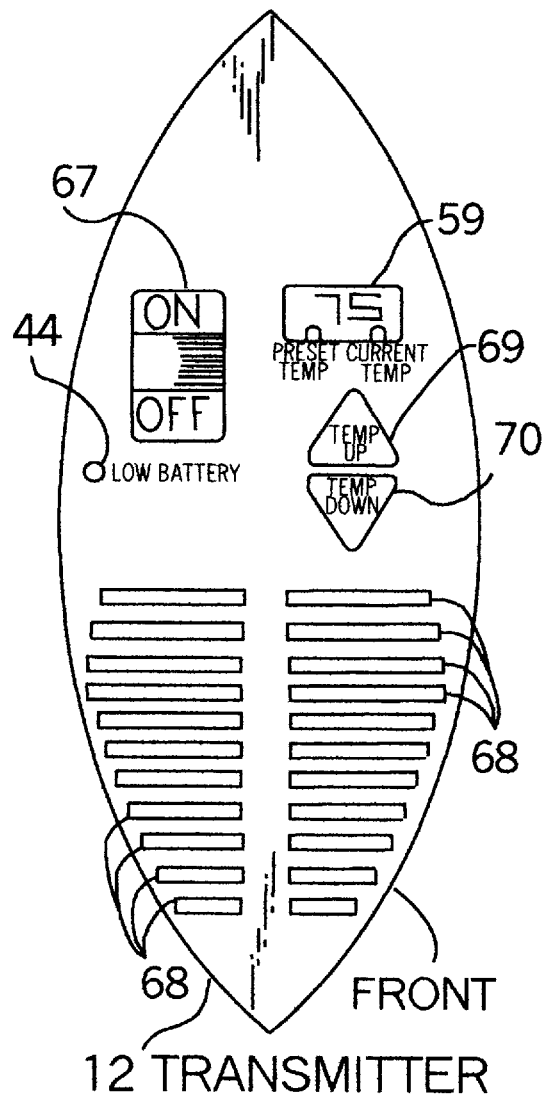

The up/down keypack 33 is a manual entry keypad, as shown in FIG. 4c the keys of which are identified as the TEMP UP key 69 and the TEMP DOWN key 70 by which the users can enter the preset temperature as desired. As the keys 69, 70 are manually depressed, coded signals indicative of the desired temperature are generated and outputted to the up/down counter 34. The up/down counter 34 converts the coded signals indicative of the desired temperature from the up/down counter 34 and outputs said signal to the comparator 32. The comparator 32, in turn, compares the signal received from the up/down counter 30 to the signal received from the up/down counter 34 and, if there is a difference therebetween delivers the resulting signal to the 30 second timer 35. Following a delay of approximately 30 seconds, the 30 second timer 35 delivers a signal to the RF transmitter 16. Said signal is used to modulate, typically either by signal amplitude (AM) or by signal frequency (FM), the RF carrier signal produced by the RF transmitter 16, and is broadcast via the transmitting antenna 36 to the receiving antenna 37, as shown in FIG. 3 of the RF receiver 38 of the control thermostat unit 11. A DIP switch 45, containing a plurality of individual switches contained in a single housing, is provided to activate the RF transmitter 16 and/or to permit the user to select the desired PF frequency for transmission. The output signal of the MUX 31 is fed into the display decoder/driver 40 for conversion to signals which will drive the 3 digits LCD display 41 to provide a digital readout for either the pre-set temperature from the up/down keypack 33 or the ambient temperature from the temperature sensor 28. The entire transmitter unit 12 is portable and is powered by a battery 42. While not essential to the present invention, for purposes of convenience, a "low battery" control circuit 43 is provided to activate a "low battery" LED 44 when the battery is low and either needs replacement or recharging.

(b) Operation of the Control Thermostat Unit

With special emphasis now on FIG. 3, operation of the control thermostat unit 11 will be described hereinafter. A selector switch 46 is provided to allow the user to select either the NORMAL MODE or the REMOTE MODE, both modes of which have been described previously herein. The control functions on the control thermostat unit 11 consists of:

(a) a NORM/RC (normal/remote control) selector switch 46, (b) a HEAT/OFF/COOL selector switch 50, (c) a FAN ON/AUTO selector switch 54, (d) a temperature scale with preset dial 58, and (e) a Liquid Crystal Display (LCD) display 64a showing the local temperature.

With the selector switch 46 set in the REMOTE CONTROL position, the receiving antenna 37 is electrically connected via the selector switch 46 to the RF receiver 38 whereby the RF signals transmitted by the RF transmitter 16 of FIG. 2 of the transmitter unit 12 to the antenna 36 are received and fed to the RF receiver 38. The DIP switch 47 is used to select the RF frequency to which the RF receiver 38 is tuned to receive the signals broadcast from the RF transmitter antenna 36 of the transmitter unit 12. The RF transmitter 16 is set to the same radio frequency as the RF receiver 38. The RF receiver 38 receives an on/off signal every 30 seconds from the transmitter unit 12 if the control thermostat unit 11 is set at REMOTE CONTROL MODE. A five minute timer 48 is electrically connected to the RF receiver 38 to turn the RF receiver 38 "ON" every 5 minutes to allow the RF receiver 38 to be activated to receive the incoming RF signal from the RF transmitter 16. If the RF receiver 38 does not receive any on/off signal in 5 minutes, the RF receiver 38 will send an "OFF" signal to the solid-state relay (SSR) 49 to turn off either the heating or cooling system (depending on how the switch 50 is set; it typically has three (3) settings: "cold", "hot", or "off".) and the fan 51. Nonetheless, the RF receiver 38 will continue to operate unless the mode is changed (from "Normal" to "Remote" or from "Remote" to "Normal") or until the RF receiver 38 receives the signal from the RF transmitter 16. When the RF receiver 38 receives the signal from the RF transmitter 16, the RF receiver 38 will send a signal to the SSR 49 to control either the cooler relay 52 or the heater relay 53. In turn, activation of the cooler relay 52 will turn the cooler of the air conditioning system "on" and the cooler commences cooling the air blown thereinover. Alternatively, activation of the heater relay 53 will turn the heater of the air conditioning system "on" and the heater commences heating the air blow thereinover.

The air is blown over the air conditioning coils or the heater coils via a electric-motor powered fan 51. The electric fan 51 is set into either an "AUTO" mode or an "ON" mode by switch 54. When set in the "ON" mode, the electric fan 51 is powered continuously. When set in the "AUTO" mode, the electric fan 51 is only powered when either the SSR 49 is turned "ON" or the SSR 55 is turned "ON".

Each of the relays, the cooler relay 52, the heater relay 53 and the fan relay 56, is typically powered by 24 volts A.C. As shown in FIG. 3, on either of the 24 volts A.C. sources, the "H" stands for "Hot" or "High", and the "N" means "Neutral" or "Negative".

Under the normal mode the RF receiver 38 will be disabled and local thermostat control circuit 57 will take over the operation of the air conditioning system.

The local thermostat control circuit 57 operates as follows. When the NORMAL/REMOTE CONTROL (NORM/RC) selector switch 46 is set to NORM, control over the air-conditioning system is transferred to the local thermostat control circuit 57. The temperature preset dial 58 setting sends an signal to the comparator 60. The temperature sensor 61 senses the ambient temperature in the area surrounding the temperature sensor 61 and sends a signal to the comparator 60. The comparator 60 electrically compares the signal from the temperature preset dial 58 and the signal from the temperature sensor 61, and, if the temperature sensor 61 senses a room temperature which is GREATER than the temperature preset dial 58 setting, then the comparator 60 sends a signal to activate the fan relay 56 and the cooler relay 52 which, in turn, activates the cooler. If, on the other hand, the temperature sensor 61 senses a room temperature which is LOWER than the temperature preset dial 58 setting, then the comparator 60 sends a signal to activate the fan relay 56 and the heater relay 53 to activate the heater.

The temperature sensor 61 provides a second signal which is fed into a signal conditioning and pulse generator unit 62 which converts the analog signal outputted from the temperature sensor 61 which is indicative of the room temperature to a string of digital pulses which are directly responsive to the sensed room temperature. Such digital pulses are fed into an up/down counter 63. The up/down counter 63 converts the digital signals received from the signal conditioner and pulse generator 62 into signals which drive the display decoder/driver 64 which converts the output of the up/down counter 63 into signals which can drive the 3 digits LCD display 64a which provides a alphanumeric readout of the sensed temperature in the room.

PREFERRED HOUSING FOR THE TRANSMITTER UNIT

Turning now to FIG. 4, there is depicted and shown a preferred illustration of the housing 65 for the transmitter unit 12. With reference now also to FIGS. 4a, 4b, and 4c, there is shown a top a rear, and a front view respectively of the housing 65. Rubber standoffs 66 are used to position the housing 65 slightly above the plane surface. This allows better air flow between the housing and plane surface resulting in a more accurate ambient temperature sensing within the transmitter unit 12. An "ON/OFF" power switch 67 controls the power to the transmitter unit 12. With reference now to FIG. 4b, there is show a rear view of the housing 65. An access door 68 is located at the rear of the housing 65 to allow access to the DC battery 42 for installation and replacement as necessary. The rubber standoffs 66 are positioned as desired and mounted to the rear of the housing 65. Turning now to FIG. 4c, there is shown and 28 (not shown in FIG. 4; see FIG. 3) illustrated the front of the housing 65. The temperature sensor 28 (not shown in FIG. 4; see FIG. 3) is positioned within the housing 65 behind the ventilation slots 68 which slots 68 allow the room air to freely circulate around the temperature sensor 28 so that the temperature of the room air can be sensed by the temperature sensor 28. A temperature up keypad button 69 via up/down keypack 33 of FIG. 2 is operably associated with the thermostat control circuit 14 for setting the temperature at a higher value. A temperature down keypad button 70 via up/down keypack 33 of FIG. 2 is operably associated with the thermostat control circuit 14 for setting the temperature at a lower value. An LCD 59 is provided for indicating what the temperature is set at. A low battery indicator 44 of FIG. 2 is provided to signal when the battery requires replacement.

PREFERRED HOUSING FOR THE CONTROL THERMOSTAT UNIT

Figure 5A:
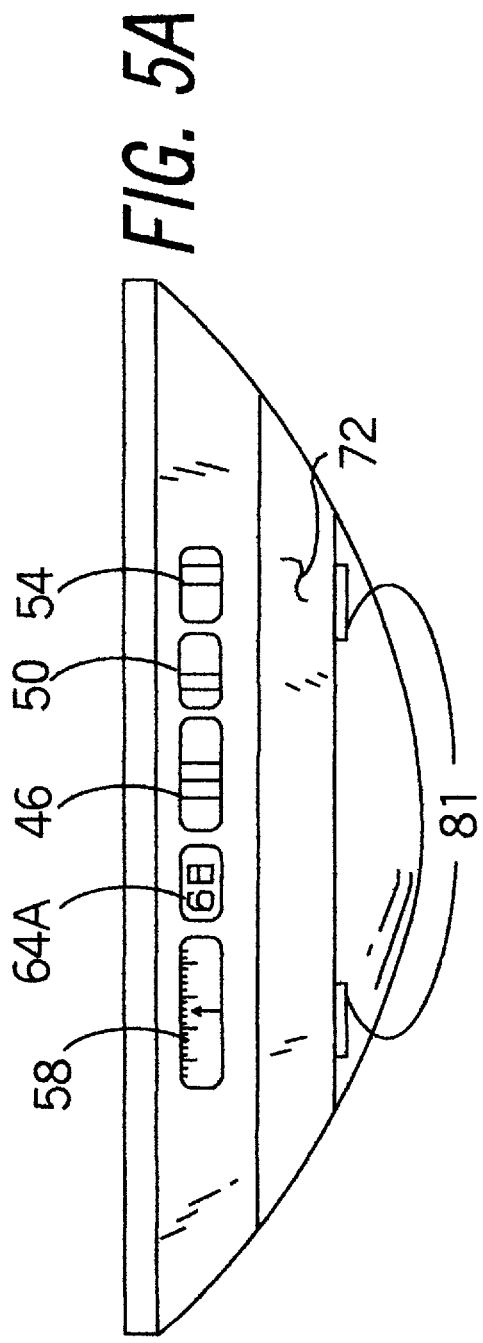
FIG. 5a, 5b, 5c are one embodiment of a housing unit for the control thermostat unit of the instant invention.
Figure 5C:
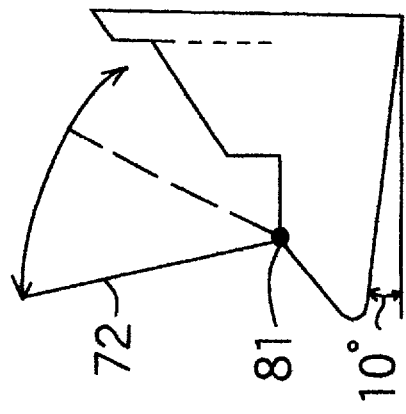
Figure 5B:
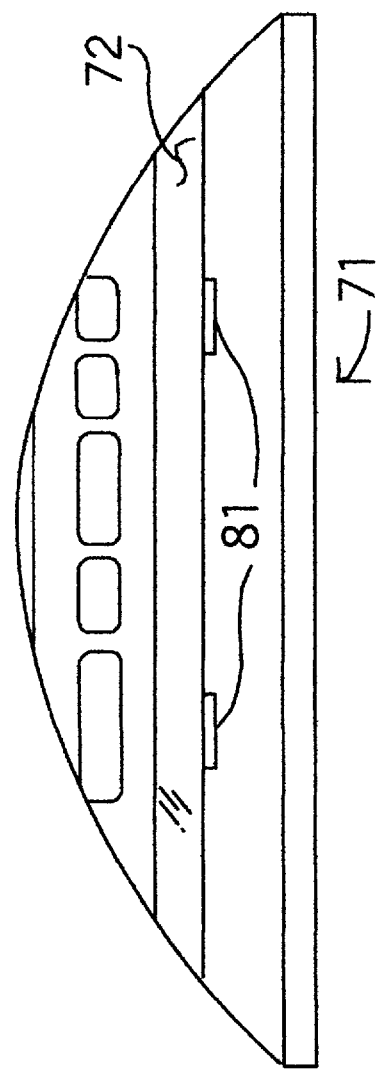

Turning now to FIG. 5 of the Drawings herein, there is shown and illustrated the preferred housing 71 for the control thermostat unit 11. The too view of the preferred housing 71 is depicted in FIG. 5a for the control thermostat unit 11. There is shown a temperature scale with preset dial 58, an LCD display 64a, a selector switch 46 for REMOTE CONTROL and NORMAL, the HEAT or COOL switch 50, and the FAN "ON" or FAN "AUTO" switch 54. A clear acrylic cover 72 is hinged by the hinges 81 to pivotally secure the cover 72 to the housing 71. The pivotal movement of the cover 72 with respect to the housing 71 is shown in FIG. 5c. FIG. 5b illustrates the front of the housing 71 showing the arrangement of the clear cover 72 and illustrating how it is hinged thereto by the hinge 81.

(c) The Register

With special reference and emphasis now on FIG. 6, 7, 8 and 9, there is generally shown and depicted a air register 13, third functional unit of the within system is the register 13 with a manually-operable, metal foil shutter air-control valve 18 which is used for controlling the air outlet via an air-duct register 21. This register 13 has an adjustable metal foil air control valve 18 in the back of the air-duct register 21 that can easily be manually-controlled by users, as shown in FIG. 6, with a rod 27a with a hook 27 on the end thereof by which to engage the opening ring 73 and the closing ring 74; the opening ring 73 is used to open the metal foil air control valve 18 to allow air to exit the air-duct register 21. and closing ring 74 is used to close the metal foil air control valve 18 to block air from exiting the air-duct register 21.

After the opening ring 73 is operated, the wire 75 connected to the opening ring 73 will recoil back into the opening 77 in the air register 21. In the same fashion, after the closing ring 74 is operated, the wire 76 connected to the closing ring 74 will recoil back into the opening 78 in the air-duct register 21. The air-duct register 21 is secured to the wall by a pair of screws 79 and 80.

With continuing reference to FIGS. 6, 7, 8 and 9, and with special emphasis flow on FIG. 8, there is shown the manually-operable, extension/retraction and storage mechanism for the metal foil shutter 18 which, in combination with the air-duct register 21 and the air duct outlet 19 and the air duct 20, forms an air-control valve unit referred to herein as register 13. In substance, the manually-operable, extension/retraction and storage mechanism for the metal foil shutter 18 operates similar to a window shade. When the metal foil shutter 18 is fully extended, it completely covers and blocks the air duct outlet 19 and prevents the air in the air duct 20 from passing therebeyond and out of the air-duct register 21. When the metal foil shutter 18 is fully retracted, the air duct outlet 19 is not blocked or obstructed and the air in the air duct 20 is permitted to pass freely therethrough and out of the air-duct register 21.

The foregoing detailed description is illustrative of several embodiments of the invention described and disclosed herein, and it is to be clearly understood that additional embodiments thereof will be obvious to those skilled in the art. The embodiments described herein, together with the additional embodiments, are all considered to be within the scope of the present invention.

What we claim as our invention is:

1. A wireless remote temperature sensing and control thermostat system for controlling air temperature and air flow through an air duct coupled to an air register, comprising:

a. a control thermostat unit;

b. a radio-frequency receiver operably coupled to and disposed within said control thermostat unit, said radio-frequency receiver operatively adapted for communication with said radio-frequency signals for controlling said control thermostat unit, wherein the radio-frequency receiver includes a timer operably coupled to the radio-frequency receiver so that in the event that the radio-frequency receiver does not receive any on/off electrical signal from the radio frequency transmitter within a pre-set time, the radio frequency receiver will generate and send an off signal to the thermostat control circuit to turn off either heating system or air conditioning system and the fan;

c. a temperature sensor for detecting air temperature therearound by changing its electrical characteristics;

d. a radio-frequency transmitter unit operably coupled to and disposed with the temperature sensor, said transmitter adapted for remote radio-frequency communication with said radio-frequency receiver of said control thermostat unit for the purpose of controlling said thermostat; and e. an adjustable shutter disposed between the air duct and the air register for controlling the flow of air therethrouqh.

2. The wireless remote temperature sensing and control thermostat system with an adjustable register of claim 4, wherein the shutter is operably disposed between the end of air duct and the air duct register so that the shutter overlaps the extremity of the openings in the air duct register so that the shutter can be manually adjusted, as desired, to totally block the flow of air from the air duct through the air duct register.

3. The wireless remote temperature sensing and control thermostat system with an adjustable register of claim 2, wherein the area into which thermally-conditioned air is delivered is divided into two zones, a temperature-controlled zone and an energy-saving zone, the temperature-controlled zone being the space where a desirable temperature is controlled through the application and use of a remote temperature-sensing transmitter placed therein and the energy-saving zone being the space into which no thermally-conditioned air is delivered and such is accomplished by blocking the flow of thermally-conditioned air thereinto by closing the shutter of each of the air duct registers that deliver air-conditioned air into the energy-saving zone.

4. A wireless remote temperature sensing and control thermostat system for manually controlling air temperature and air flow through an air duct coupled to an air register, comprising:

a. a control thermostat unit;

b. a radio-frequency receiver operably coupled to and disposed within said control thermostat unit, said radio-frequency receiver operatively adapted for communication with said radio-frequency signals for controlling said control thermostat unit;

c. a temperature sensor for detecting air temperature therearound by changing its electrical characteristics;

d. a radio-frequency transmitter unit operably coupled to and disposed with the temperature sensor, said transmitter adapted for remote radio-frequency communication with said radio-frequency receiver of said control thermostat unit for the purpose of controlling said thermostat; and e. an adjustable shutter disposed between the air duct and the air register for controlling the flow of air therethrough wherein said manually adjustable shutter for controlling the flow of air from the air-duct to the air-duct register, comprises:

a shutter formed of a continuous sheet of durable and flexible material;

a spring-loaded rod upon which said shutter is operably mounted;

means for operably securing the combination formed by the shutter and the rod to the exit of the air-duct between said air-duct exit and the air-duct register;

means for manually controlling the position of the shutter with respect to the air-duct, said manual control means including means for positioning said shutter over the air-duct exit to completely block the flow of air therefrom, or to partially block the flow of air therefrom, or to allow the full and free flow of air therefrom.

5. The wireless remote temperature sensing and control thermostat system with an adjustable register of claim 5, wherein said spring-loaded rod upon which said shutter is operably mounted is mounted to the air duct side of the air duct register via a pair of complementary pins mounted to the opposite ends thereof, with one pin being freely moveable and the other pin being fixed in position relative to the rod, so that when the metal foil forming the shutter is unrolled therefrom, the energy is stored in the spring by means of a pawl and ratchet arrangement may be used to re-position the shutter relative to the air duct to allow the manual selection of the position of the metal foil to select the desired control of air exiting through the air duct.

6. A wireless remote temperature sensing and control thermostat system with an adjustable register for operating an environmental control unit which regulates an environmental condition at a remote location, comprising:

(a) a transmitter unit disposed at said remote location, said unit including:

(1) temperature sensing means for sensing the temperature of said remote location;

(2) signal conditioning and pulse generator means operably coupled to the temperature sensing means for receiving the output of the temperature sensing means and generating pulses indicative of the temperature sensed by the temperature sensing means;

(3) a keypack means for manually entering a desired temperature and encoding the output of said keypack means into a series of pulses having an up-temperature signal for increasing a preset temperature setting by an incremental step above the preset temperature;

a down-temperature signal for decreasing a preset temperature setting by an decremental step below the preset temperature;

a preset temperature signal for maintaining the closed environment temperature to the preset temperature;

(4) up/down counter means for receiving and counting the encoded output of said keypack means;

(5) up/down counter means for receiving and counting the output of said signal conditioning and pulse generator means wherein said generated pulses are indicative of the temperature sensed by the temperature sensing means;

(6) comparator means operably coupled to said up/down counter means to receive the encoded output of said keypack means and operably coupled to said up/down counter means for receiving and counting the output of said signal conditioning and pulse generator means indicative of the temperature sensed by the temperature sensing means, whereby said comparator means generates a signal indicative of the difference between said preset temperature set by said keypack and said sensed temperature of the environment from said temperature sensing means;

(7) timer means operably coupled to said comparator means to output the signal output of said comparator means only after a desired period of time;

(8) radio-frequency transmitter means for receiving the output signal of said timer means for broadcasting the combination of the radio-frequency signal and the outputted signal from said timer means;

(9) an antenna operably coupled to the output of said radio-frequency transmitter means for broadcasting said output of said radio-frequency transmitter means to a remote location;

(b) a control thermostat unit disposed at said remote location from said transmitter unit, said unit including:

(1) an antenna for receiving the output of said radio-frequency transmitter means at the remote location of said control thermostat unit;
(2) a radio-frequency receiver means operably coupled to said antenna for receiving the output of said radio-frequency transmitter means at the remote location of said control thermostat unit;
(3) power-switching means operably coupled to said radio-frequency receiver means for receiving the encoded output signal of said radio-frequency receiver means for switching "ON" or "OFF", in response to encoded output signal of said radio-frequency receiver means, the relay which controls the electrical power to operate the air cooling unit of the air-conditioning system, and relay which controls the electrical power to operate the air heating unit of the air-conditioning system, and relay which controls the electrical power to operate the fan to move the conditioned air throughout the air-conditioning system to the air-duct registers.

7. The wireless remote temperature sensing and control thermostat system with an adjustable register for operating an environmental control unit which regulates an environmental condition at a remote location of claim 6 further comprising a switch operably coupled to the output of said antenna for said radio-frequency receiver, said switch being used to direct the output of said antenna to either the radio-frequency receiver, or to some other thermostat control circuitry, as desired.

8. The wireless remote temperature sensing and control thermostat system with an adjustable register for operating an environmental control unit which regulates an environmental condition at a remote location of claim 6, further comprising a timing means for controlling the output of the radio-frequency receiver to the solid state switch means on a time-delay basis so that the output signal of the radio-frequency receiver is only generated at desired times and for the duration of time selected thereby.

* * * * *